June 28, 1960　　　M. R. PRISTACH　　　2,942,740
LOAD TRANSFER SYSTEM, ESPECIALLY FOR SHIPS AT SEA
Filed March 27, 1958　　　　　　　　　　　　6 Sheets-Sheet 1

FIG. I.

INVENTOR.
MILTON R. PRISTACH
BY
ATTORNEYS.

INVENTOR.
MILTON R. PRISTACH

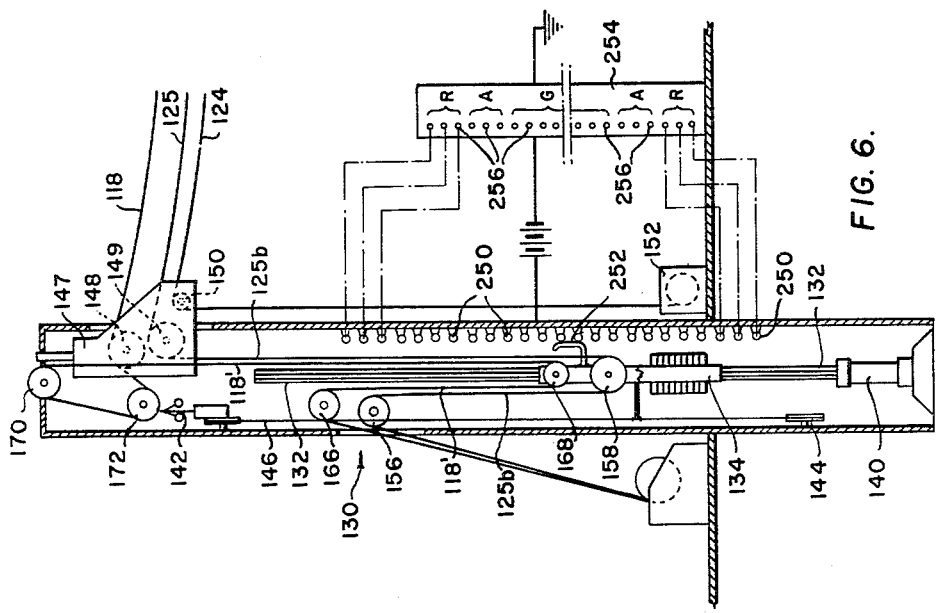
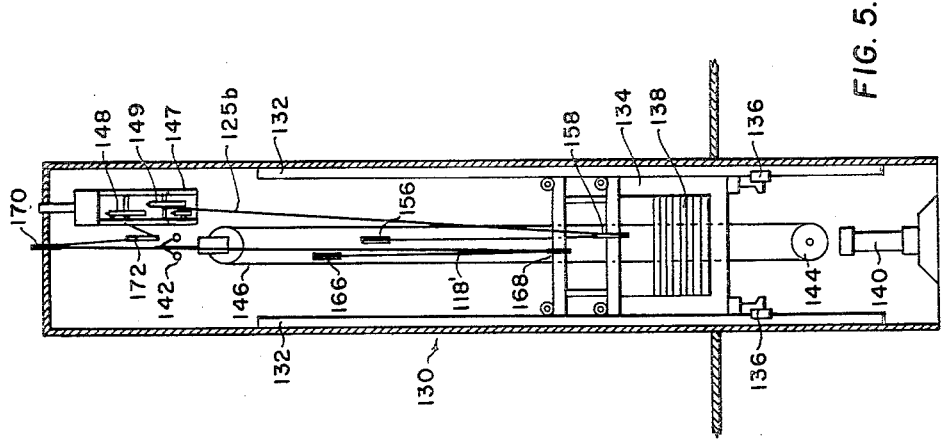

June 28, 1960     M. R. PRISTACH     2,942,740
LOAD TRANSFER SYSTEM, ESPECIALLY FOR SHIPS AT SEA
Filed March 27, 1958     6 Sheets-Sheet 6
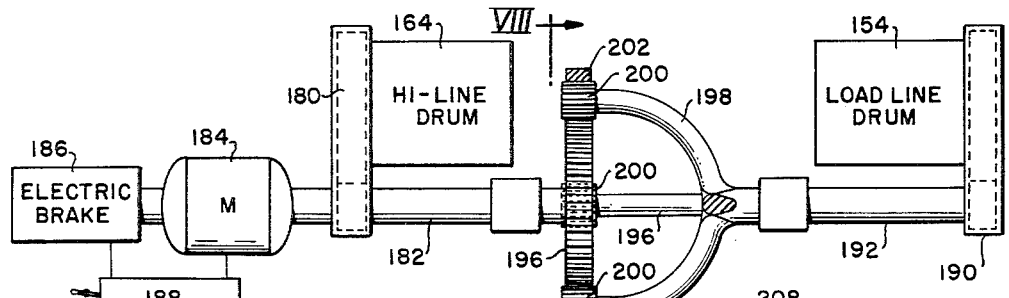
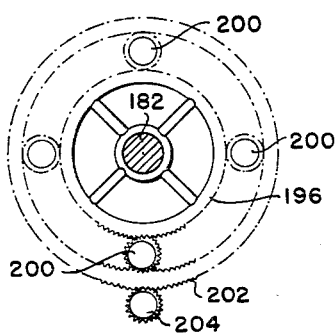
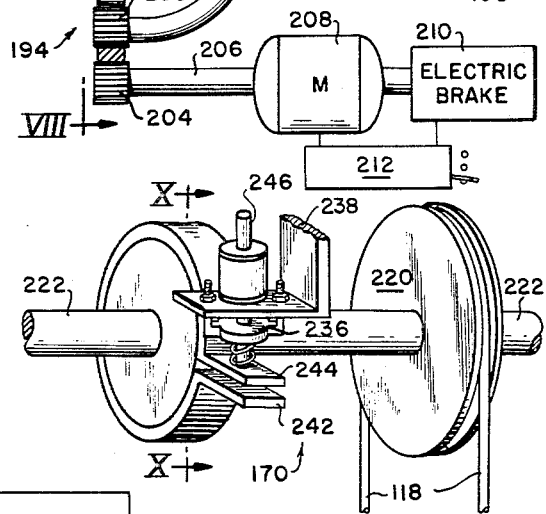
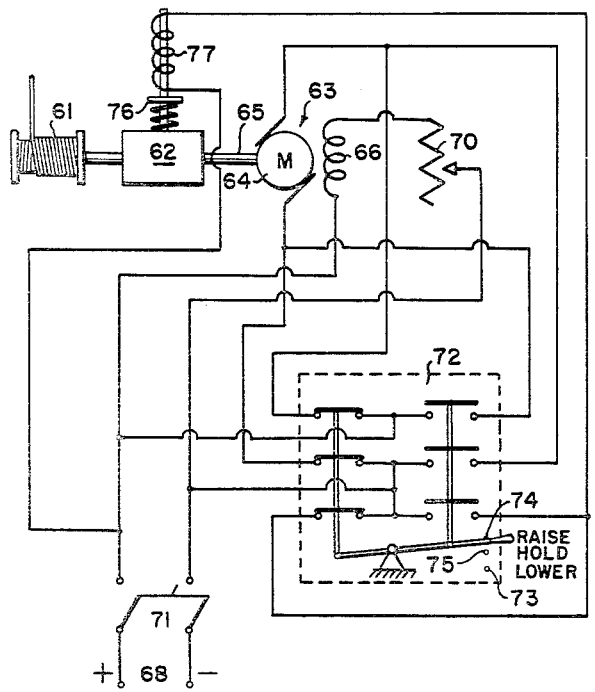
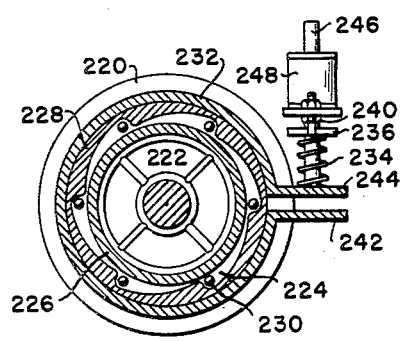
*INVENTOR.*
MILTON R. PRISTACH
BY
*ATTORNEYS.*

United States Patent Office 2,942,740
Patented June 28, 1960

2,942,740
LOAD TRANSFER SYSTEM, ESPECIALLY FOR SHIPS AT SEA

Milton R. Pristach, United States Navy

Filed Mar. 27, 1958, Ser. No. 724,489

11 Claims. (Cl. 214—13)

(Granted under Title 35, U.S. Code (1952), sec. 266)

The invention described herein may be manufactured and used by or for the Government of the United States for governmental purposes without the payment of any royalties thereon or therefor.

This invention is directed to improvements in means for the transfer of loads between a pair of spaced stations, and particularly between ships at sea.

Loads can be transferred between stations by supporting the loads on a wire cable stretched between the stations. In the case of liquids, the cable can support a hose through which the liquid flows; and in the case of dry loads, the cable can support a trolley carrying the load and movable on the cable between the stations. Such systems are adaptable to the transfer of loads between mobile stations such as ships underway at sea; but in naval parlance, the cable between the ships is more commonly called a high line or a span wire, depending on employment or product transferred. The cable is usually called a high line when the load is dry cargo or the equivalent, and a span wire when the load is flowing liquid.

In known methods for the transfer of loads at sea, it is customary to securely attach one end of the high line or span wire to an elevated point of the load-receiving ship. The other end of the cable is manually controlled from a winch on the sending ship in order to keep the cable above the sea. However, because of relative motion between the ships caused by rolling, heaving, surging, pitching, and the like, it is extremely difficult and at times impossible to keep proper tension in the cable, with the result that the cable may become so slack as to cause the load to dip into the sea; or the cable may become so taut as to break, causing casualties.

An object of the present invention is to provide a simple, effective, and easily operated system for transferring products between ships at sea which does not have the marked disadvantages of prior systems.

A further object of the invention is to provide a transfer system in which a substantially uniform tension is automatically maintained in the high line or span wire by means aboard ship, in spite of changing relative positions of the load-receiving and load-sending ships.

Another object of the invention is to provide a transfer system of a type described in which the amount of tension in the high line or span wire is kept under control at a value that can be adjusted to the load.

Still another object of the invention is to provide a transfer system of a type described that is utilizable with liquid loads and with dry or solid loads or similar cargo.

In accordance with the preferred forms of the invention the load-delivering ship is provided with an elongated vertical kingpost, shaft or hoistway similar to the conventional elevator shaft. The high line or span wire is reeved to a weight means that rides up and down in the hoistway. This system maintains substantially uniform tension on the high line or span wire. Should the distances between the ships change more than a safe amount, the high line or span wire can be lengthened or shortened as the need may be through a winch on which one end of the high line or span wire is attached and wound. For manually controlling the winch, signal lights may be provided showing the position of the weight means in the hoistway, thereby indicating when an adjustment of the length of the high line should be made. Preferably the winch and its control are on the sending ship.

Other objects and many of the attendant advantages of this invention will be readily appreciated as the same becomes better understood by reference to the following description when considered in connection with the accompanying drawings in which like reference numerals designate like parts throughout the figures thereof. In order to avoid complexity of well-known details, the invention is shown in an elementary form in the drawings in which:

Figs. 5 and 6 are simplified views, partly in sections at right angles, schematically showing components of the invention at the sending ship for the transfer of dry loads;

Fig. 7 is a view of a differential gearing arrangement for controlling the high line and load line winches at the sending end of a dry load transfer system;

Fig. 8 is a view on the line VIII—VIII of Fig. 7;

Fig. 9 is a perspective view of a unidirectionally braked sheave means in the reeving of a high line at the sending ship;

Fig. 10 is a view on the line X—X of Fig. 9; and

Fig. 11 is a wiring diagram for controlling any of the winch motors utilized in the transfer systems.

Figure 1:
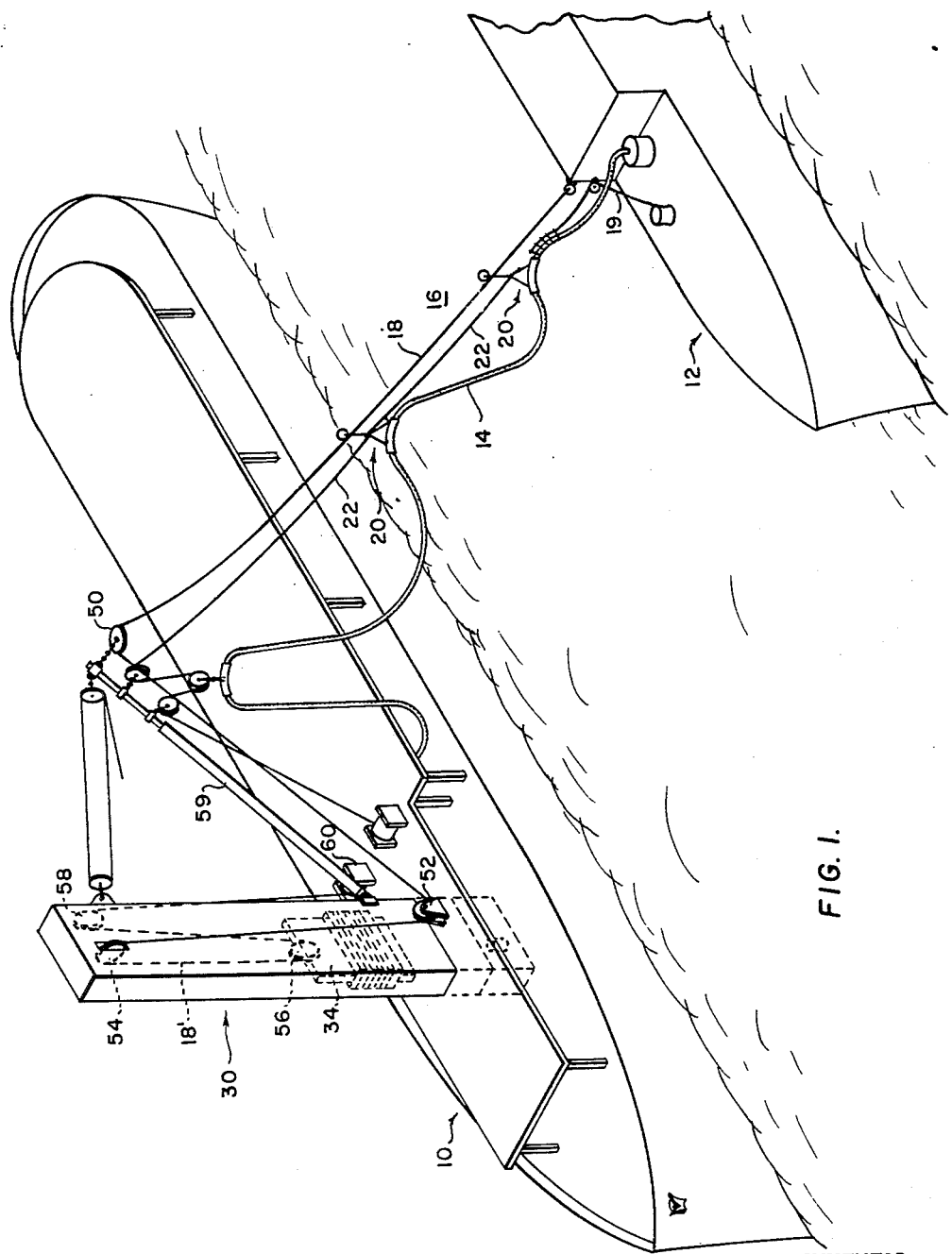
Fig. 1 is a simplified view generally showing two ships rigged to transfer liquid loads between them in accordance with the invention.
Figure 3:
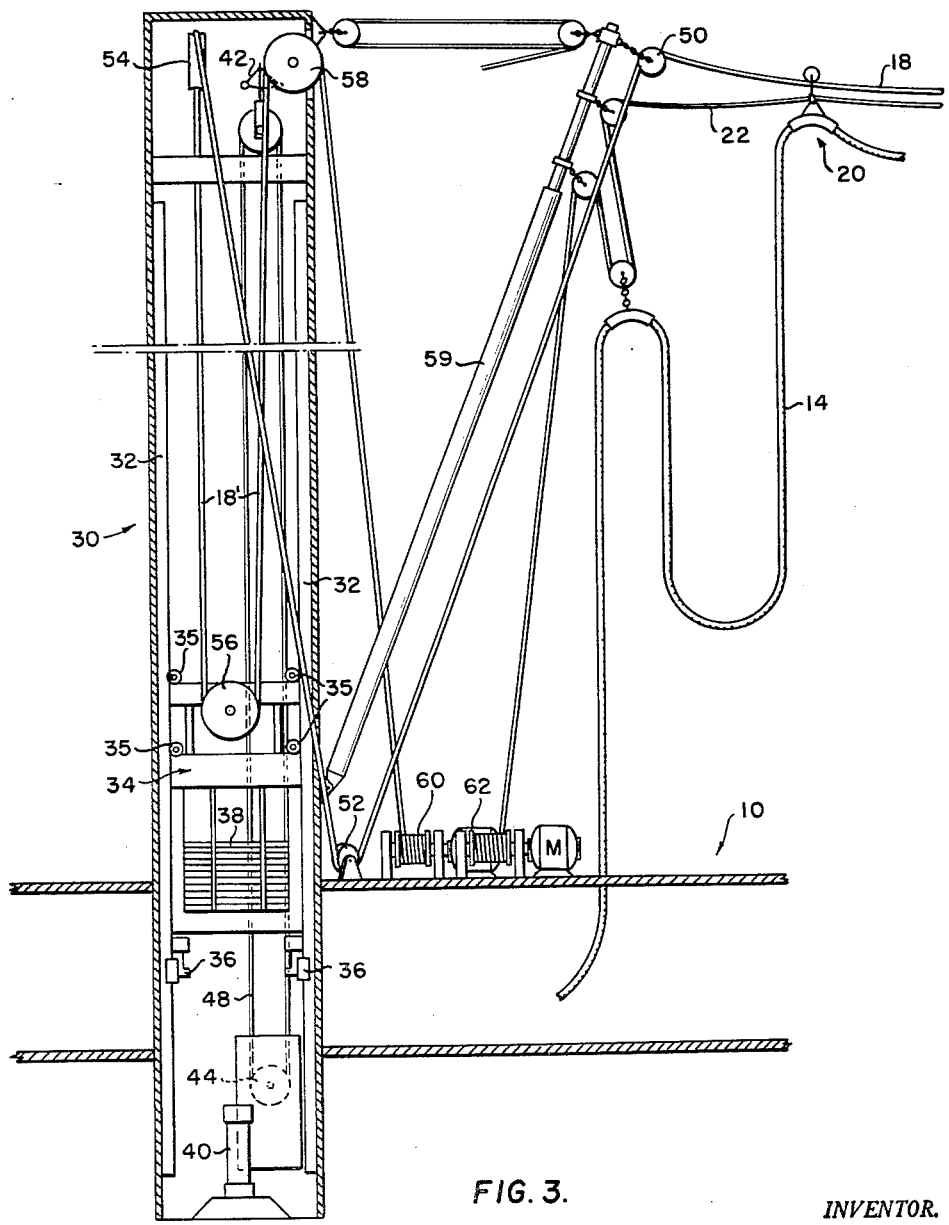
Figs. 3 and 4 are simplified views, partly in sections at right angles, schematically showing components of the invention at the sending ship for the transfer of liquid loads.

Referring to Figs. 1 and 3, a supply or load-sending ship 10, in this case an oiler, carries liquid supplies such as for example, oil, water or gasoline, for a ship 12. For transferring the liquid load, a hose 14 is provided between the ships, the hose 14 being held above water by a transfer system indicated in its entirety by the reference 16. As is customary in such systems, the transfer system 16 comprises a hose-supporting cable or span wire 18 having its outboard end anchored in a suitable manner on the receiving ship. A hose messenger line 19 is lashed to the outboard end of the hose for initially pulling the hose from the oiler to the receiving ship 12; and a plurality of saddle assemblies 20 support the hose at a plurality of spaced points along the span wire 18, the assemblies having rollers that roll along the wire. For returning the hose to the oiler after replenishment operations, the saddle assemblies 20 have retrieving or saddle lines 22 secured thereto, as is known to the art.

In accordance with the invention, special means is provided for rigging the inboard portion of the span wire 18, this means including means by which the span wire 18 is controlled as to length and tension. To this end, the ship 10 is provided with a rectangular vertical hoistway in the nature of an elevator shaft. The hoistway is indicated in its entirety by the reference numeral 30. The hoistway has a pair of internal vertical guide rails 32 along which a weight means can ride up and down. The weight means comprises a car or frame 34 provided with guide rollers 35 that engage the rails 32 and with lower guide roller safety clamps 36. The weight means also comprises a plurality of removable weights 38 that are loaded onto the car 34. The hoistway 30 has an access opening that permits as many weights 38 as desired to be loaded or unloaded from the car to bring the total weight of the weight means to the value desired, this value being interdependent with the maximum permissible load or tension on the span wire 18 for the distance between the ships 10 and 12.

The hoistway 30 extends downwardly through one or more decks of the ship 10, preferably above and below the main deck, so as to provide a large travel distance for the counterweighted car 34. The bottom of the hoistway 30 is above the ship's keel and is provided with one or more oil buffers 40 which also serve to support the car in its lowermost position at rest.

An important feature of the invention resides in the provision of a safety system operable when the speed of descent of the car becomes excessive or exceeds a predetermined value, such as might occur for example when a span wire snaps or breaks. Such safety systems are known in the elevator art, and may comprise, for example, a governor 42 mounted at the top of the hoistway, a tension sheave 44 at the bottom of the hoistway, the safety clamp-guides 36 on the car 34, and a governor rope 48 interconnecting the governor, sheave and guides. The guides 36 incorporate spring-controlled safety clamps. Safety systems of this kind are known to the art, being shown for example in U.S. Patent Nos. 1,581,459, dated April 20, 1926; 1,678,031, dated July 24, 1928; and 2,150,373, dated March 14, 1939.

Briefly, in the operation of a system of this kind, when the downward motion of the car 34 exceeds a predetermined speed, the governor 42 trips a mechanism that clutches the governor rope 48 with enough force simultaneously to "trip," or set into operation from a ready to stopping condition, both safety clamps of the safety guides 36. Thereupon steel wedges of the safety guides grip the rails 32 with sufficient force to bring the car 34 to a smooth sliding stop within a short distance. The gripping action may be released and the safety guides 36 restored to ready condition for another stopping action simply by hoisting the car upwardly for a few inches, such action releasing the wedges and resetting them. The car can be hoisted, if desired, by operation of the motor that controls the winch for the span wire 18. Should the car 34 fall freely when it is too close to the buffers 40 to attain a speed for operating the safety guides, the buffers are adequate to stop the car under such conditions.

The safeguarded weighted car 34 is supported in the hoistway 30 by a bight of the inboard end of the span wire 18 at the sending ship 10. To this end, the inboard end of the span wire 18 passes, or is rigged, over a suitable sheave system. The sheave system shown comprises a plurality of pulley means, several of which are indicated at 50, 52, 54, 56 and 58. The pulley means 50 is secured to a boom 59, and the pulley means 52 is secured to a deck of the ship 10 at a point near the hoistway 30. The pulley means 54 and 58 are supported by sides of the top of the hoistway 30; and the pulley means 56 is supported centrally at the top of car 34. In the simplified showing, the inboard end of the span wire 18 at the ship 10 is secured to a winch 60, passes around pulley means 58, downwardly to pulley means 56 at the top of car 34, upwardly to pulley means 54, downwardly outside the hoistway 30 and around pulley means 52, upwardly to pulley means 50 at the top of the boom, and then outward to the receiving ship 12. For identification purposes, the variable portion or bight of the span wire 18 that extends inside the hoistway 30 between the pulley means 54 and 58 and about pulley means 56 is given the reference numeral 18'. This portion 18' supports the weighted car when the car is above the buffer 40. Preferably the pulley means 56 on car 34 is supported by means including shock absorbers in order to avoid shock-loading on the attachment point of the span wire on the receiving ship such as may occur when the span wire is initially tensioned.

The winch 60, which is secured to a deck of the ship 10, is controlled by any suitable means, such as an electric or hydraulic motor, and appurtenances known to the art.

Assuming that the equipment is rigged as described and the necessary weights are placed in the car 34 for tensioning the span wire 18 sufficiently to support the loaded hose 14 extending between the ships 10 and 12, the operation of the system is as follows:

If the ships were absolutely stationary and all forces and loads constant, the equipment would be in a state of equilibrium with a constant tension in the span wire 18, with the car 34 somewhere in the hoistway 30, say about the middle of the hoistway, and with a fixed and definite length of the span wire 18 between the winch 60 on the sending ship 10 and the anchoring or attachment point of the span wire on the receiving ship 12.

Suppose now the distance between the ships changes, say increases, for any reason such as a slight surge of one of the ships ahead of the other. This means that the length of the span of wire between ships must increase. The surge of the ship causes an additional pull or tensioning force on the span wire 18 that will raise the car 34 in the hoistway 30. The length of the span wire between ships is automatically increased at the expense of the length of the bight 18' until equilibrium is again restored. No operation of the winch 60 is necessary. Should the distance between the ships slightly decrease for any reason then the result will be that the car 34 will lower in the hoistway 30. In actual practice, the car may be continually riding up and down in the hoistway.

The winch 60, as well as any other winch of the system, may be controlled by a suitable means known to the art; and Fig. 11 is representative of a simplified control applicable to any of the winches with electric motor driving means. The winch 61 of Fig. 11 is suitably geared through gearing 62 to a reversible direct current motor 63. The motor 63 has an armature 64, a shaft 65, and a field winding 66. The field winding is directly connected to a direct current power supply 68 through a speed-controlling variable resistor 70 and a disconnect switch 71. The armature 64 is connected to the energizing contacts of a reversing switch 72 through which the direction of rotation of the motor shaft 65 can be controlled.

In one position of the operating handle of the switch 72, say when positioning latch 73 is engaged, the armature 64 is connected to the power supply for operating the motor 63, so as to rotate the winch 61 to unwind the line wound around it, for instance the line 18, so as to feed more line out. This will tend to lower the weight means in the hoistway. In the other extreme position of the handle of the switch 72, say when positioning latch 74 is engaged, the operation is such as to wind the line on the winch 61 so as to take in line. This will tend to raise the weight means in the hoistway. In intermediate position of the handle, say when positioning latch 75 is engaged, the motor 63 is deenergized and stationary. In the intermediate position with the motor stationary, a spring-operated brake 76 operates on gearing 62 to hold it stationary or fixed. This brake is released so that the winch can rotate when brake-solenoid 77 is energized. The brake-solenoid 77 is energized when the switch handle is in the raise position and when it is in the lower position.

The safety system including clamp guides 36 on the car 34 is an important feature of the system. Thus, it will prevent serious casualties should the span break as occasionally happens. Such an accident may occur when the counterweighted car 34 is at the top of hoistway 30. Should the contingency happen, the car will fall freely. However, the safety system comes into operation under such circumstances and quickly stops the fall of the car before it can go right through the hull structure. In one installation, a descent rate of the car of about nine feet per second (or a free fall of approximately 13 inches) caused operation of the safety system.

The transfer system described has the further advantage of permitting more play between ships than the maximum length of the support portion or bight 18'. This advantage is obtained through operation of winch 60 when the weight means, comprising car 34 and weights 38, approaches either of the limits of its vertical travel in the hoistway. The winch control may be either automatic or manual, the latter operation having been herein described for simplicity in connection with Fig. 11. Operation of the winch 60 is controlled by an operator observing the position of the car 34 in the hoistway 30 or the equivalent. Should the car be at or near the top of the hoistway, the operator causes the winch motor to pay out more line for the span 18, so that the car lowers in the hoistway, assuming that the winch 60 pays out the line faster than the distance between the ships increases, as is usually the case. When the car is again centrally of the hoistway, the operation of the winch is stayed. For raising the car 34 when it is at or near the bottom of the hoistway, the span wire 18 is wound on the winch, shortening the length of bight 18', assuming that the winch takes in the span wire faster than the ships' separation decreases. Preferably, the operator should keep the car 34 within an operating range of about the center one-third of the hoistway. For controlling the speed of operation of the winch, the adjustable field rheostat in the field winding of the driving motor of the winch can be manipulated.

In rigged condition of the transfer system, the hose 14 and the whips and retrieving lines are normally either loose or under such slight tension that these lines readily follow changes in ships' separation.

The winch 60 is also used to release and reset the safety guide means 36 when the safety means has come into action through too rapid a descent of car 34, as previously described. Once released the safety guide means can be reset by raising the car 34 a few inches.

Figs. 2 and 5–11 illustrate a dry load transfer system in accordance with the invention for transferring dry load from a supply or sending ship 110 to a receiving ship 112, the dry load transfer system being indicated in its entirety by the reference numeral 116. This transfer system comprises a high line 118 having its outboard end secured to ship 112, a trolley 119, a load 120 comprising a carriage block and hook, with or without cargo, outhaul line 122, inhaul line 124, and a load line 125 that supports the load 120. The lines 122 and 124 are attached to the trolley 119, and are winch-controlled from the ships in the usual manner. The load line 125 has one end attached to a high point of the receiving ship 112, and its other end is rigged at the ship 110 in a manner subsequently indicated. The trolley 119 generally comprises a pair of upper sheaves that ride the supporting high line 118 and a pair of lower sheaves for the bight 125a of the load line 125, the lower end of the bight passing about a sheave 126 of the load block. The foregoing arrangement is conventional.

In accordance with the invention a vertical hoistway 130, in the nature of an elevator shaft, is provided in the ship 110. The hoistway 130 corresponds to that of Figs. 1 and 3, and includes opposite rails 132, weight means comprising car 134, guide rollers and safety clamp guides 136, and adjustable weights 138, buffers 140, governor 142, tension sheave 144, and governor rope 146 for operating the safety clamp guides, similar to the corresponding parts of Figs. 1, 3, and 4.

At the supply ship end, the high line 118 goes out to sea after passing through a trunnnion structure pivoted for limited rotation about a vertical axis, as shown in more detail in application Serial No. 724,490 of Sawyer et al., filed concurrently herewith and hereby made part of this application by reference. For simplicity, the trunnion structure is herein shown as comprising a framework 147 rotatably carrying a sheave 148 for the high line, a sheave 149 for the load line, and a sheave 150 for the inhaul line. These shaves are part of the rigging for the various lines.

The inhaul line 124 is rigged from a winch 152 secured to a deck of the sending ship 110 and passes over sheave 150 and out to sea.

The inboard end of the load line 125 is attached to a load-line winch 154 from whence it passes to a suitable sheave system shown simplified as pulley means including, in order, a sheave 156 in the upper part of hoistway 130, a sheave 158 rotatably carried by the car 134, and the sheave 149 from which the line passes out to sea. Rigged as described, the load line has a bight 125b in the hoistway 130, the lower end of which passes in tension around the sheave 158 of the weight means comprising car 134.

The inboard end of the high line 118 is attached to a high-line winch 164 from whence it passes to a suitable sheave system shown simplified as pulley means including, in order, a sheave 166 in the upper part of hoistway 130 above sheave 156, a sheave 168 rotatably carried by the car 134 centrally thereof and above the sheave 158, a top anti-hunting sheave means 170 and a fairing sheave means 172 in the upper part of the hoistway 130, and the sheave 148 from which the high line passes out to sea. Rigged as described the high line has a bight 118' in the hoistway 130, the lower end of which passes in tension around the sheave 168 of the weight means comprising car 134 and weights 138.

The high line bight 118' supports substantially the full weight of the weight means that provides the required degree of tension in the high line. The load line 125 is used to raise and lower the carriage and its load 120 from and to the decks of the ships, and must be adequate to hold the carriage and load as they travel between ships. In one embodiment, the high line tension and load line tension were in a ratio of about four to one.

In order to control the load line and the high line separately, the two winches 154 for the load line and 164 for the high line are interconnected by a control means indicated in Figs. 7, 8 and 11.

The high line winch 164 has a drum for the line that is directly geared by gearing 180 to the shaft 182 of a reversible D.C. electric motor 184 having a spring-applied, electrically-released brake 186. The high line motor 184 and electric brake 186 are controlled by a control means and in the same manner as described for the motor and brake of Fig. 11. For identification this control means has been referenced 188 in Fig. 7.

The load line winch 154 has a drum for this line that is directly geared by gearing 190 to a shaft 192.

The two shafts 182 and 192 are interconnected by a differential gearing 194 which has been shown as a planetary gearing. For such interconnection, an end of the high line shaft 182 has fastened thereon a central gear 196 of the gearing 194; and an end of the load line shaft 192 terminates in quadrature arms 198 at the ends of which are rotatably mounted planet gears 200 of the differential gearing 194. The planet gears 200 mesh with the central gear 196 and with internal gear teeth of a rotatable ring gear 202 of the gearing 194. The gearing 194 is completed by a drive pinion 204 that meshes with external teeth of ring gear 202. The pinion 204 is secured to a shaft 206 of a reversible D.C. electric motor 208 provided with a spring-applied, electrically-released brake 210. The load line motor 208 and the electric brake 210 are controlled by a control means 212 and in the same manner as described for the motor and brake of Fig. 11.

It has been found desirable to provide a protective means in the high line rigging for limiting or damping excessive movement or "hunting" of the weight means in the hoistway 130 under certain conditions. This protection can be accomplished by one-way braking in the high line sheave means 170 at the top of the hoistway; and Figs. 9 and 10 show a construction for that purpose.

With reference to Figs. 9 and 10, the sheave means 170 comprises a sheave 220 for the high line 118, the sheave being secured to a shaft 222 rotatably carried in the hoistway by any suitable means. The shaft 222 has secured thereto a one-way or free-wheeling spring-applied, electrically released brake comprising a one-way clutch 224 having an inner clutch member 226 secured to the shaft 222, an outer clutch member 228 having "saw-tooth" grooves and clutch balls 230. It is evident that should shaft 222 rotate clockwise with respect to Fig. 10, the balls 230 will be forced to the large voids of the grooves so that the shaft rotates freely or without hindrance. With rotation of the shaft in the opposite direction, the balls jam between the clutch members 226 and 228 forcing them to rotate together.

The outer surface of the outer clutch member 228 is a brake wheel or drum against which the brake shoe 232 is adjustably pressed by a compression spring 234 the upper end of which, in Fig. 10, presses against a U-member 236 fastened to a fixed support 238. The U-member 236 has its legs threaded so that the compression in spring 234 can be adjusted by nuts 240 at the support 238.

The brake shoe 232 has a fixed protuberance 242 and a second protuberance 244 against which the other end of spring 234 presses. A rod 246 is secured to protuberance 244 and passes loosely through member 236 and support 238, and through an electromagnetic coil 248. The rod has an armature portion adapted to be attracted when coil 248 is energized and raise protuberance 244 against the pressure of spring 234 for releasing the brake whenever desired.

Figure 2:
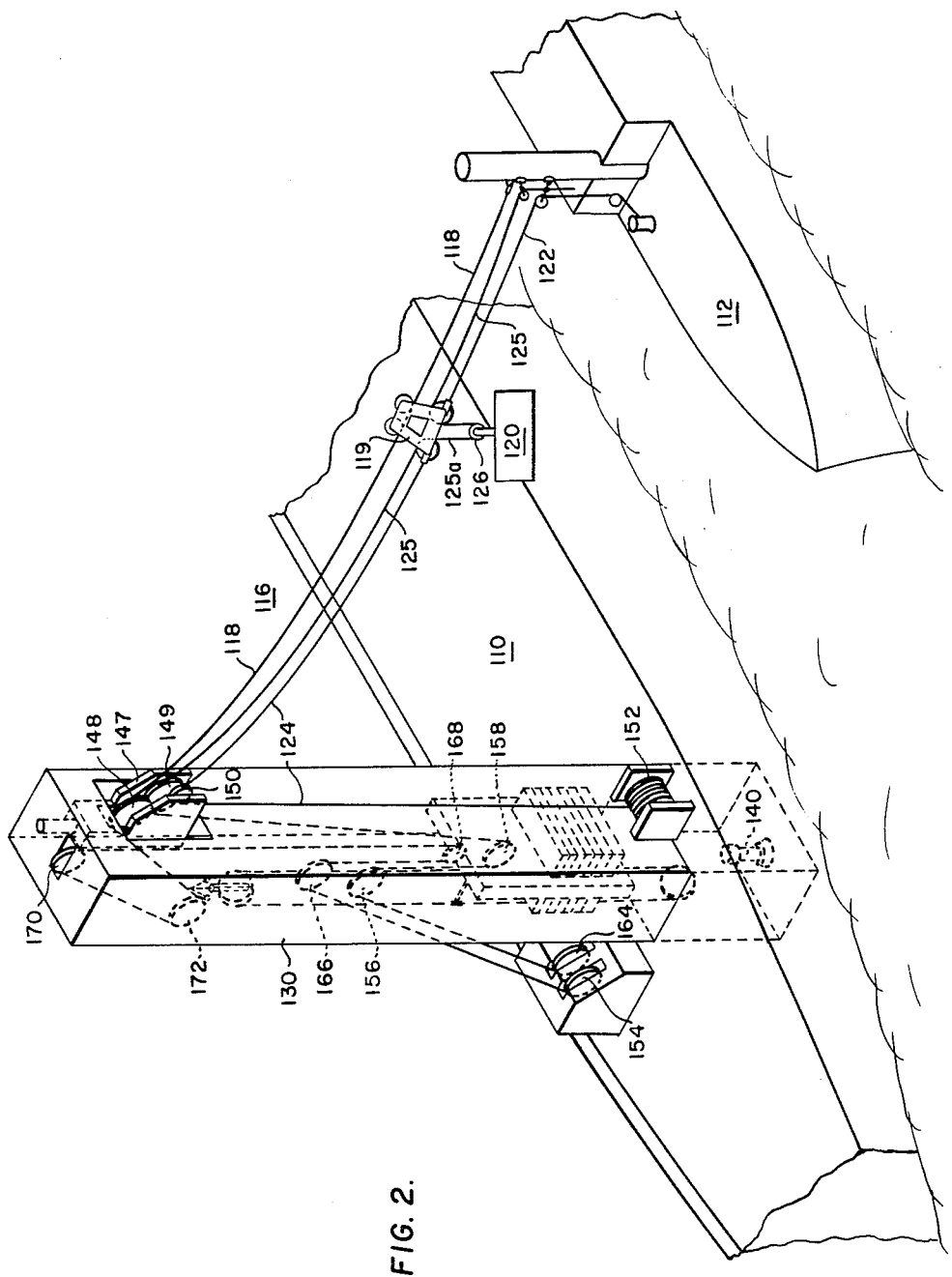
Fig. 2 is a simplified view generally showing two ships rigged to transfer dry loads between them in according with the invention.

With respect to the counterweight tensioning or weight means in the hoistway 130, the operation of the dry load transfer system of Fig. 2 is similar to that of the liquid load transfer system of Fig. 1. While dry load is moving along high line 118, the interconnected winches 154 and 164 are held or braked. The weight means, comprising car 134 and weights 138, acts as a substantially constant tensioning means on the high line; but it moves up and down in the hoistway 130 to compensate for changing lengths of span of the high and load lines as the ships move. However, the sheave means 170 is such that the sheave 220 thereof freely rotates when the span decreases, causing the weight means to fall. When the span increases, the sheave will rotate in the opposite direction so that braking is applied to it. The braking prevents hunting of the span-catenary while the load is being transferred between ships. In the event that the weight means should drop with excessive speed, as may occur when the high line 118 snaps, the safety guide clamp means 136 come into action, as previously described.

Through the differential gearing 194, the high line winch 164 may be operated whenever necessary for maintaining the car 134 away from its extreme limits of vertical travel; and the load line winch may be operated whenever necessary for hoisting and lowering load during automatic tensioning operation of the system. Thus, assume that the high-line and load-line motors 184 and 208 are in the hold position, that is, the line drums are held stationary by the associated brakes 186 and 210. Tolerable changes in line span between ships are taken up by movement of the weight means in the hoistway 130. Assume further that the load is over the receiving ship 112. Operation of control 212 will release brake 210 and will energize motor 208 causing rotation of pinion gear 204. However, because brake 186 of the high line control system is still holding the high line winch, and because the load on the high line drum is much greater than that on the loadline drum, the differential gearing driven by pinion 204 will cause shaft 192 to rotate, thereby unwinding loadline and dropping the load onto the ship 112.

For raising the load back, the control 212 is temporarily operated in raise position for winding loadline on the load line drum.

In a similar way, the energization of the high line motor 184 with the load line motor deenergized and braked, will cause direct rotation of the high line drum and rotation of the load line drum through gearing 194, since pinion 204 is locked or held which in turn will hold ring gear 202, so that planet gears 200 will be rotated by central gear 196. Accordingly, adjustment of the high line bight 118' by operation of high line winch 164 automatically correspondingly adjusts the load line bight 125b. If desired, both sheaves 158 and 168 on car 134 may be spring supported on the car to accommodate slight variations in positions of the high and load lines 118 and 125, and to minimize the effects of shock loading.

In the usual gearing arrangement, the high line shaft 182 and the load line shaft 192 drive their respective drums at the same speed but in opposite directions. Therefore, the high line is overwound on its drum and the load line is underwound on its drum, so that the lines pay out and haul in simultaneously at the same rate. For all practical purposes the difference in effective drum diameters created by the variation in line diameters can be ignored, especially since the load line bight can function to compensate for the differences in span length caused by the variations.

In summary, the load is hoisted or lowered by suitable activation of the load line motor 208. Actually, the load line can be hauled in or payed out regardless of whether the high line drum is moving or stationary. Utilization of a differential gearing between the drums provides a simple way for controlling the load line by both motors, one controlling the total span, and the other the raising and lowering of the load.

The hoistway 30 or 130 may be an open framework or may be closed for weather protection, but provided with suitable access openings. In either case it is desirable to provide signal means adjacent the controls for the span wire or high line winch, that indicate the relative position of the car 34 or 134 in the hoistway. Such a signal means is indicated in Figs. 4 and 6.

Figure 4:
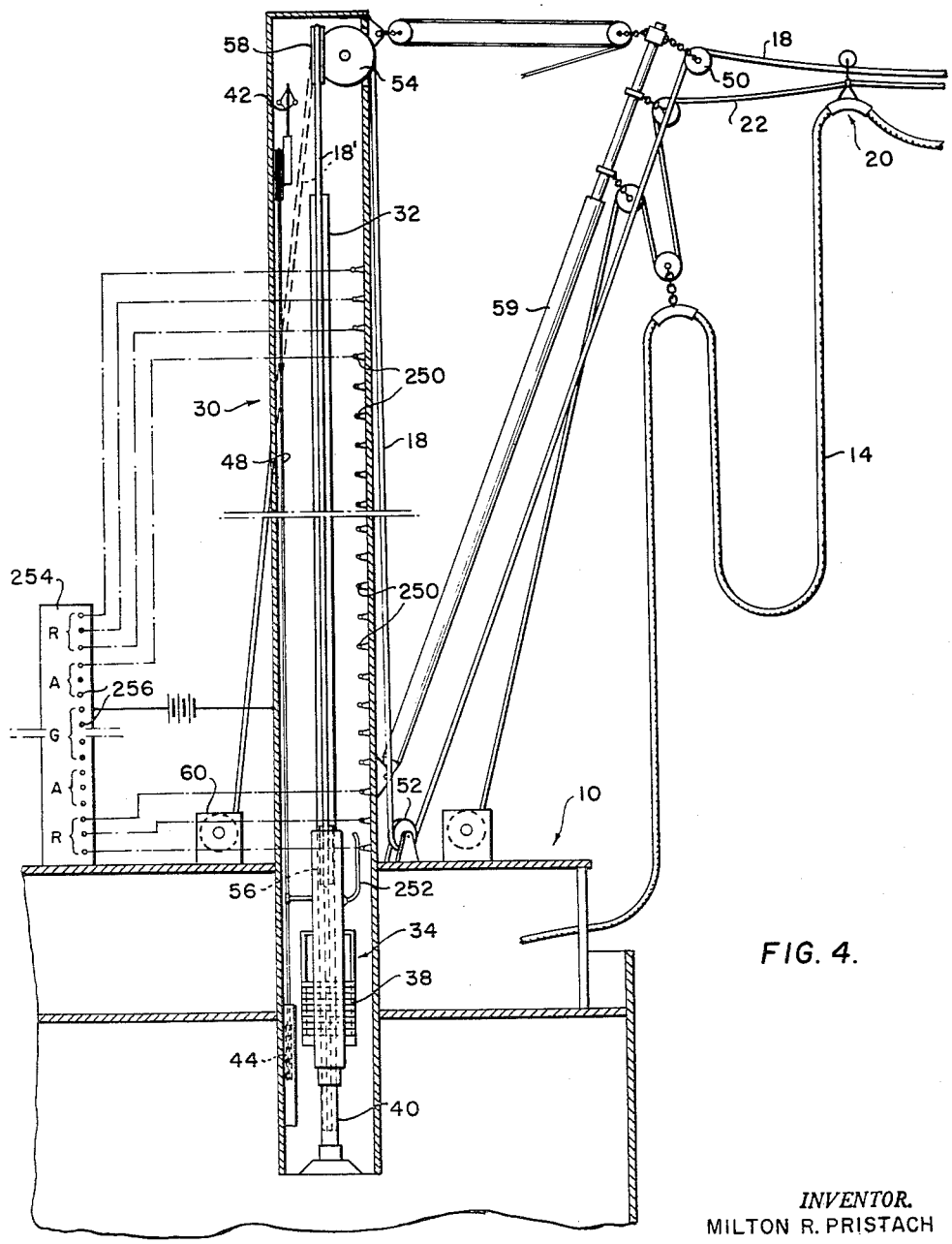

As indicated in Figs. 4 and 6, a plurality of car-operated switches 250 are arranged along the travel distance of the respective cars in their respective hoistways. The switches are normally pressed open, but are closed by a switch operating cam 252 on the car. A vertical signal board 254 has a plurality of signal lamps 256 vertically arranged therein and connected to the switches 250 in the same sequence. Accordingly, the car will close only the switches that energize the signal lamps indicative of the relative position of the car in the hoistway. Thus, the car in its uppermost position will cause display of only the uppermost lamps in the board 254; the car in its lowermost position will cause display only of the lowermost lamps in the board 254; and in an intermediate position will light only those lamps corresponding to that position.

Preferably, the extreme end lamps display red signals for danger, several of the next adjacent lamps display amber for caution, and the remaining lamps display green as indicating the most desirable range of positions for the car in the hoistway. An operator, upon seeing the amber or red display can operate the line winches properly for bringing the car into the green area.

It should be understood, of course, that the foregoing disclosure relates to only a preferred embodiment of the invention and that it is intended to cover all changes and modifications for the example of the invention herein chosen for the purposes of the disclosure, which do not constitute departures from the spirit and scope of the invention.

What is claimed is:

1. A system for transferring loads between a pair of spaced stations including a mobile station, comprising in combination, a cable extending between said stations, a hoistway at a first of said stations having rail means, said cable having a bight in said hoistway, weight means ridable up and down in said hoistway and having guide means cooperating with said rail means, safety means responsive to the speed of downward movement of said weight means and comprising operable safety clamp means on said weight means ridable along said rail means, and comprising speed responsive means for operating said clamp means when said weight means travels at an excessive speed, whereby to slow down said weight means, rigging means for said cable comprising sheave means for the upper ends of said bight, and comprising sheave means attached to said weight means and receiving the lower end of said bight, load means supported by said cable, a winch receiving the other end of said cable, and control means for operating said winch to wind or to unwind said end of said cable on the winch, one of said sheave means comprising dampening means to reduce hunting of said cable during operation of said control means.

2. A system for transferring loads between a pair of spaced stations including a mobile station, comprising in combination, a cable extending between said stations, a hoistway at a first of said stations having rail means, said cable having a bight in said hoistway, weight means ridable up and down in said hoistway and having guide means cooperating with said rail means, safety means responsive to the speed of downward movement of said weight means and comprising operable safety clamp means on said weight means ridable along said rail means, and comprising speed responsive means for operating said clamp means when said weight means travels at an excessive speed, whereby to slow down said weight means, rigging means for said cable comprising separate pulley means for the upper ends of said bight, and comprising pulley means attached to said weight means and receiving the lower end of said bight, one of said separate pulley means comprising a sheave for the associated end of said bight, a brake means, and a free-wheeling clutch between said brake means and said sheave, load means supported by said cable, a winch receiving the other end of said cable, and control means for operating said winch to wind or to unwind said end of said cable on the winch.

3. A high line system for transferring dry cargo between a pair of ships underway, comprising in combination, a hoistway on a first of said ships, a guided structure guidably ridable up and down in said hoistway, said structure comprising a weight means, a high line extending between said ships and having an end secured to the second ship, said high line having a bight in said hoistway, a trolley ridable on said high line, load carriage means carried by said trolley, a load line for said carriage means, said load line extending between ships and having one end secured to said second ship, said load line having a bight in said hoistway, upper sheave means for the upper ends of said bights, winch means for the other ends of said high and load lines, said structure having sheave means attached thereto, the last said sheave means receiving the lower parts of said bights.

4. A high line system as defined in claim 3 but further characterized by control means for said high line winch, control means for said load line winch, and differential gearing means between said high line and load line winches.

5. A high line system as defined in claim 3 but further characterized by said upper sheave means comprising a sheave for said high line, a sheave for said load line, and trunnion means rotatably carrying said sheaves.

6. A high line system as defined in claim 3 but further characterized by brake means for said upper sheave means for said high line bight.

7. A high line system as defined in claim 6 but further characterized by said brake means having means rendering the brake means operative as a brake only in one direction of rotation of said upper sheave means.

8. A high line transfer system for transferring dry cargo between a pair of ships underway at sea, comprising in combination, a hoistway on a first of said ships, said hoistway having rails therealong, car means ridable up and down in said hoistway, safety clamp guide means on said car means, a high line extending between said ships, said high line having a bight in said hoistway and having its outboard end secured to the second of said ships, a trolley ridable on said high line, load carriage means carried by said trolley, pulley means on said car means for receiving the lower end of said bight, a winch on said first ship receiving the inboard end of said high line, control means for said winch for controllably winding and unwinding said high line thereon, upper pulley means receiving the upper ends of said high line bight, said upper pulley means comprising a pair of sheaves, trunnion means rotatably carrying a first of said sheaves, weights carried by said car for tensioning said high line, safety means responsive to downward speed of said car means and operable when the speed becomes excessive for braking the car means, and a brake means for the second sheave of said upper pulley means, said brake means including an overrunning clutch.

9. A high line system as defined in claim 8 but further characterized by said brake means including a free wheeling clutch.

10. A high line transfer system for transferring dry cargo between a pair of ships underway at sea, comprising in combination, a hoistway on a first of said ships, said hoistway having rails therealong, car means ridable up and down in said hoistway, safety clamp guide means on said car means, a high line extending between said ships, said high line having a bight in said hoistway and having its outboard end secured to the second of said ships, a trolley ridable on said high line, load carriage means carried by said trolley, pulley means on said car means for receiving the lower end of said bight, a winch on said first ship receiving the inboard end of said high line, upper pulley means receiving the upper ends of said high line bight, a load line extending between said ships and having an inboard bight in said hoistway and an outboard bight at said trolley receiving said load carriage means, said upper pulley means comprising a pair of sheaves, trunnion means rotatably carrying a first of said sheaves, weights carried by said car for tensioning said high line, control means for said winch for controllably winding and unwinding said high line thereon, upper pulley means for the upper ends of said load line inboard bight, pulley means on said car for the lower part of said inboard bight, a winch for the inboard end of said load line, control means for said load line winch for controllably winding and unwinding said high line thereon, and a differential gearing means between said high line and load line winches.

11. A high line system as defined in claim 8 but further characterized by said second sheave being between said winch and said car means.

References Cited in the file of this patent

UNITED STATES PATENTS

| | | |
|---|---|---|
| 489,749 | Low | Jan. 10, 1893 |
| 668,071 | Walsh | Feb. 12, 1901 |